(12) United States Patent
Seils et al.

(10) Patent No.: US 6,668,781 B1
(45) Date of Patent: Dec. 30, 2003

(54) ELECTRIC STARTER DEVICE FOR AN INTERNAL COMBUSTION ENGINE

(75) Inventors: Wolfgang Seils, Ludwigsburg (DE); Manfred Ackermann, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 09/856,893

(22) PCT Filed: Aug. 5, 2000

(86) PCT No.: PCT/DE00/02631

§ 371 (c)(1),
(2), (4) Date: May 29, 2001

(87) PCT Pub. No.: WO01/24339

PCT Pub. Date: Apr. 5, 2001

(30) Foreign Application Priority Data

Sep. 20, 1999 (DE) .......................................... 199 46 808

(51) Int. Cl.[7] .............................................. F02M 11/08
(52) U.S. Cl. ................................ 123/179.3; 123/179.28
(58) Field of Search ....................... 123/179.3, 179.28; 290/38 R; 361/25, 26; 318/473

(56) References Cited

U.S. PATENT DOCUMENTS

| | | | | |
|---|---|---|---|---|
| 4,389,692 A | * | 6/1983 | Sander et al. | 361/29 |
| 5,525,881 A | * | 6/1996 | Desrus | 318/471 |
| 5,838,591 A | * | 11/1998 | Yamaguchi | 700/299 |
| 6,122,153 A | * | 9/2000 | Becker | 361/25 |

FOREIGN PATENT DOCUMENTS

| | | |
|---|---|---|
| EP | 0 771 947 A | 5/1947 |
| EP | 0 550 426 A | 7/1993 |
| FR | 2 717 961 A | 9/1995 |

* cited by examiner

Primary Examiner—Mahmoud Gimie
(74) Attorney, Agent, or Firm—Michael J. Striker

(57) ABSTRACT

The invention relates to an electric starter for an internal combustion engine, having a thermal monitoring protector (4) for turning the starter (1) off when its limit operating temperature is reached. The starter is characterized by a device (5) for ascertaining a virtual operating temperature ($T_V$); the device (5) ascertains the virtual operating temperature ($T_V$) as a function of at least one operating parameter that affects the operating temperature of the starter (1).

10 Claims, 1 Drawing Sheet

ELECTRIC STARTER DEVICE FOR AN INTERNAL COMBUSTION ENGINE

Figure 1:
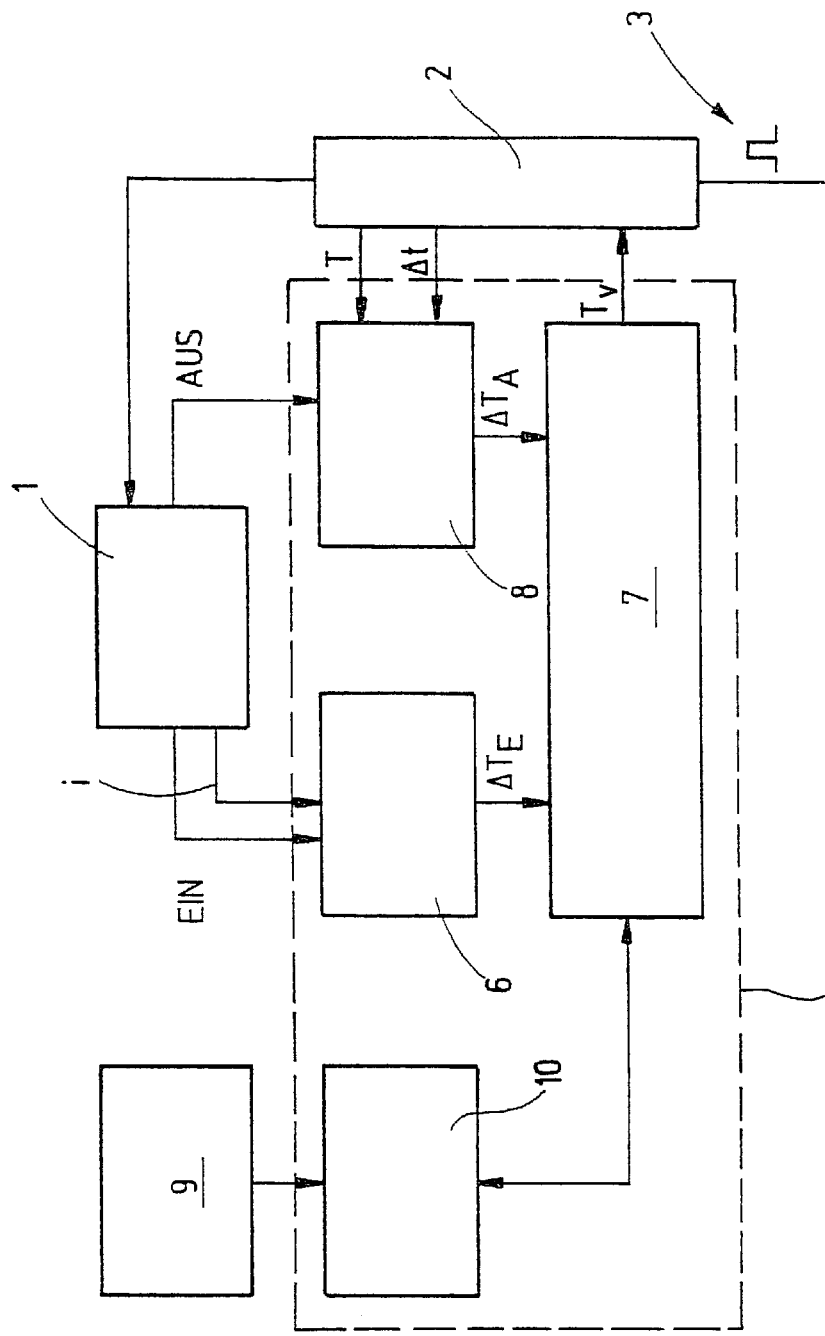

The invention relates to an electric starter for an internal combustion engine.

PRIOR ART

In luxury cars, so-called tip starters are preferably used, which automatically perform the starting operation for the internal combustion engine by means of a starting pulse. The result is a decoupling between the selection of starting and the starting event itself. In tip-starters, the starting event is thus controlled electronically and is ended at the earliest possible moment, for instance once the engine is at a predeterminable minimum rpm. Since the starting event is not successful in all cases, provision must be made to assure that the starting event will not be continued indefinitely, both to protect the starter battery and to avoid a thermal overload on the electric starter. It has been found that in electric starters, the hottest points, with the greatest potential risk, are the carbon brushes and the commutator.

To make a thermal monitoring protection for such starters feasible, it is known in the prior art to dispose a bimetallic switch in the region of or next to the so-called terminal 45 (positive starter terminal). Disposing the bimetallic switch in the region of the critical (hottest) points, however, is either very difficult or even impossible in engineering terms. The bimetallic switches must accordingly be designed such that they react, i.e. switch, at a temperature at which it is assumed that a maximum possible limit operating temperature is occurring at the highest-risk points of the starter.

Such bimetallic switches are indeed simple in design and in their principle of operation, but they are relatively large. Moreover, their switching performance involves to severe hysteresis. Besides, the activation and deactivation temperature is highly subject to variation. Since the bimetallic switch cannot be made with the requisite low impedance necessary for the main starter current, the choice is made to have the bimetallic switch trigger a relay, which switches the main starter current. This arrangement means an additional plug connection in the relay circuit and a double line between the relay and the bimetallic switch. Thus it contributes to increasing the resistance in the relay circuit.

ADVANTAGES OF THE INVENTION

The electric starter for an internal combustion engine offers the advantage over the prior art that because a virtual operating temperature of the starter is ascertained, sensor costs and installation space, lines, and an increase in resistance in relay circuit no longer occur. Moreover, turning the electric starter on and off does not involve hysteresis, and the activation and deactivation temperature can be specific precisely. Finally, the electric starter of the invention offers the advantage that the problems of the difference in temperature response between the sensor point and the actual monitoring point (brushes, commutator) no longer arise. These advantages are attained in that a virtual operating temperature of the starter is ascertained, and it is provided that this virtual operating temperature is ascertained as a function of at least one operating parameter that affects the operating temperature of the starter. It has been found that when a virtual operating temperature is ascertained as a function of an operating parameter of the starter, a high degree of agreement with actual temperatures occurring at the various components is obtained. In this respect, the electric starter of the invention thus offers the advantage that—without direct measurement—the temperature range of interest can be detected very precisely, and the temperature of the electric starter can be ascertained precisely.

In a further feature of the invention, it is provided that in operation of the starter, that is, as the operating temperature of the starter rises, the virtual operating temperature is ascertained at least as a function of the starter current Primarily it is the operating current of the starter that causes the heating of the starter. That is, if this operating parameter is taken into account in ascertaining the virtual operating temperature, then a heating model can be made that very precisely reflects again the operating temperature of the starter as a function of the ON time of the starter.

Preferably, when the operating temperature is falling, the OFF time of the starter is taken into account. That is, the virtual operating temperature is affected as a function of the OFF time. Hence if the starter is not in operation, then from the OFF time—on the basis of the previously ascertained, higher virtual operating temperature—the cooling temperature or temperature gradient is ascertained.

In a preferred embodiment of the electric starter, it is provided that the virtual operating temperature is ascertained as a function of a reference temperature, in particular the ambient temperature of the starter. Thus it can be provided that when the starter is in operation, the rising virtual operating temperature is ascertained on the basis of the ambient temperature. Conversely, in the cooling-down phase, it can be stated that the virtual operating temperature cannot drop below the ambient temperature.

It is preferably provided that the device has a means for detecting the ambient temperature. It is thus possible to perform a calibration between the virtual operating temperature and the ambient temperature, since the detection means ascertains the actual ambient temperature. A reference can thus be made between the virtual operating temperature and an actually measured temperature, especially the ambient temperature or the reference temperature.

One exemplary embodiment is distinguished in that the virtual operating temperature is ascertained as a function of the current ratio $(i/i_0)^b$. That is, a standardized starter current is taken into account, where i is the actual starter current, $i_0$ takes a reference current into account. The exponent b can be assumed to be a starter-specific parameter. Because the virtual operating temperature is ascertained as the function of the current ratio, a reference can also be established for whether the starter is heating up very quickly or not so much. If because of temperature factors, for instance, the engine is subjected to an increased torque in the starting event, usually the consequence is an increased starter current. The starter would accordingly heat up much faster. This is taken into account in ascertaining the virtual operating temperature as a function of the current ratio.

To make it possible to graph the cooling down of the starter very precisely, it is preferably provided that during the OFF time of the starter, increased cooling of the starter is assumed, if the virtual operating temperature is especially high. In other words, if a high temperature difference exists between the virtual operating temperature and the reference temperature, in particular the ambient temperature, then the starter can dissipate its heat to the environment relatively quickly. In the upper temperature range, the cooling down is thus speeded up. This is taken into account with the provision according to the invention.

If the OFF times last relatively long, it can be provided that a reduction in the cooling gradient of the virtual operating temperature is assumed. That is, as the virtual operating temperature falls, it approaches the ambient temperature more and more slowly. This influence is accordingly taken into account in the ascertainment of the virtual operating temperature.

In a preferred exemplary embodiment, it can be provided that as a function of the OFF time of the starter and of its instantaneous virtual operating temperature, the virtual operating temperature is set equal to the ambient temperature. For instance, if the starter is out of operation for a relatively long period of time, and if the model calculation assumes that the starter has already cooled down completely, but the virtual operating temperature is above or below the ambient temperature, then—to make it possible to start the system again from a reference point—the virtual operating temperature is set equal to the ambient temperature. It is thus assumed here that after a certain OFF time, the starter has the same temperature as the ambient temperature or reference temperature. This assures that any error that may have been incorporated into the determination of the virtual operating temperature is corrected at defined time intervals.

It can also be provided that as a function of the cooling gradient, the virtual operating temperature is set equal to the ambient temperature or reference temperature. If the virtual operating temperature decreases only very slightly over time, then the virtual operating temperature can be reset to the ambient temperature, since it can be assumed that the actual operating temperature of the starter is virtually identical to the ambient temperature.

Alternatively, it can also be provided that as a function of the OFF time and/or of the cooling gradient, the virtual operating temperature is adapted in stages to the reference temperature or ambient temperature.

Further advantageous features will become apparent from the dependent claims.

DRAWING

The invention is described in further detail below in terms of an exemplary embodiment in conjunction with the drawing. The sole FIGURE, FIG. 1 is a block circuit diagram of an electric starter with a device for ascertaining a virtual operating temperature.

DESCRIPTION OF THE EXEMPLARY EMBODIMENT

In the block circuit diagram, the electric starter for an internal combustion engine is identified by reference numeral 1. The starter is preferably a so-called tip starter, which is triggerable via a control unit that in response to a control pulse 3 actuates the starter 1 until such time as the engine (not shown) that is to be started has reached a predetermined rpm. After that, the control unit turns the starter 1 off again, to protect it from damage. The control unit 2 preferably has a protective function to guard against misuse of the starter 1, so that the starter 1 cannot be activated while the engine is running, for instance.

The block circuit diagram also shows a thermal monitoring device 4 for the thermal monitoring protection of the starter 1. The monitoring device 4 preferably forms a unit with the control unit 2 and in particular is integrated with the control unit 2.

The monitoring device is embodied as a device 5 for ascertaining a virtual operating temperature of the starter 1. As a function of at least one operating parameter affecting the operating temperature of the starter 1, the device 5 ascertains the virtual operating temperature. This creates a temperature model, which either comes quite close to the actual operating temperature of the starter 1 or is precisely equal to it. This operating parameter is for instance the main starter current i, which is detected by the device 5. The device 5 also detects whether the starter 1 is on or off, or in other words has been activated by the control unit 2 or put out of operation by it.

Once the starter 1 has been activated, in a heating model 6 the rising operating temperature of the starter 1 is converted into the virtual operating temperature of the starter 1, as a function of at least the starter current i. The heating model 6 preferably functions in accordance with a method that includes a heating gradient $\text{delta}T_E$ proportional to a current ration $(i/i_0)^b$, in which $i_0$ represents a reference current, especially the rater current, of the starter 1, and b represents a starter-specific parameter and can be selected to suit the particular model of starter involved. The heating gradient $\text{delta}T_E$ is sent to an integrator and calibrator 7, which by integration from the heating gradient $\text{delta}T_E$ ascertains the virtual model temperature or operating temperature $T_V$ and sends it to the control unit 2. Based on the virtual operating temperature $T_V$ ascertained, the control unit 2 decides whether the starter 1 can continue in operation or must be put out of operation, the latter being the case if the virtual operating temperature $T_V$ reaches the maximum possible limit operating temperature of the starter 1.

If the starter 1 is not in operation, then in a cooling model 8 the thermal cooling gradient $\text{delta}T_A$ is ascertained and forwarded to the integrator and calibrator 7. The cooling gradient $\text{delta}T_A$ is affected by the magnitude of the absolute temperature T, which—at the onset of the cooling-down phase—is assumed to be the previously ascertained virtual operating temperature that was attained while the starter 1 was in operation. The OFF time deltat of the starter 1 also affects the cooling gradient $\text{delta}T_A$. If the absolute temperature is high, then the cooling gradient $\text{delta}T_A$ increases. With an increasing OFF time deltat, the cooling gradient $\text{delta}T_A$ decreases. Based on the cooling gradient $\text{delta}T_A$, the integrator and calibrator ascertains the falling virtual operating temperature $T_V$ and sends this on to the control unit 2.

In order for instance at the onset of operation of the starter 1 to obtain a virtual starting operating temperature, the device 5 has a temperature detection means 9, for instance embodied as a temperature sensor, that ascertains the ambient temperature of the starter 1. In a calibration model 10, the ambient temperature detected is compared with the virtual operating temperature. The OFF time deltat of the starter 1 is taken into account as well. If the starter 1 has been out of operation for a very long time, for instance, then in the calibration model 10 it is determined that the virtual operating temperature and the ambient temperature have the same value. The virtual operating temperature $T_V$ thus ascertained, which is now equivalent to the ambient temperature, is forwarded to the control unit 2. This assures that any model error that might have been incorporated into the integrator and calibrator 7 will be corrected at certain time intervals. Alternatively, instead of the temperature detection means 9, the temperature measured at the control unit 2 or some other reference temperature is used, which is then utilized—like the ambient temperature—for the calibration of the virtual operating temperature $T_V$.

The heating model 6 and the cooling model 8 preferably operate by a so-called description function, in which the individual influences that affect the gradients $\text{delta}T_E$ and $\text{delta}T_A$ are each represented by a factor of suitable dependency. Since the main starter current i has a very great influence on the heating gradient deltaT$_E$, the latter can be occupied by a high factor, for instance. In particular, all the essential dependencies can be detected. These include in particular the dependency of the heating on the starter current, the dependencies on the differential temperature between the commutator of the starter and the ambient temperature, the dependency on the absolute temperature, and the dependency on the time. In the temperature range of interest, that is, essentially around the deactivation temperature range of the starter, a high match can thus be achieved between the virtual operating temperature T$_V$ and the actual measured values that—in an experiment—are ascertained. It is accordingly found that the virtual operating temperature T$_V$ quite precisely reflects the actual temperature of the starter 1, and in particular of the commutator and of the brushes.

Because the virtual operating temperature T$_V$ is ascertained, or in other words is a quasi-assumed operating temperature of the starter, additional conditions can easily be taken into account in the heating and cooling models 6 and 8. For instance, it can be advantageous for the turn-off temperature to be raised in an individual case, for instance to enable actuating the starter in emergency situations as well. Because of the calibration in the calibration model 10 after relatively long phases in which the starter 1 is out of operation, any temperature model error that may have been incorporated is corrected at certain time intervals with a guaranteed ambient temperature, so that the virtual operating temperature T$_V$ is reset to a guaranteed value. All the models 6, 8 and 10 are preferably structured as a description function with individual factors in accordance with different dependencies. These parameters can therefore be adapted easily to given vehicle-specific properties. Thus different starters with one and the same device 5 can be used in different vehicle types, since the models 6, 8 and 10 can easily be modified.

The models 6, 8 and 10 are preferably realized by means of a microprocessor, in which the models can be converted both via analytical equations that require little storage space and via tables with little computation effort. In particular, it can be provided that the analytic equations and tables be ascertained in prior heating tests of the starter 1, for instance to enable ascertaining the actual heating of the starter 1 for a certain main starter current during a predetermined length of time.

What is claimed is:

1. An electric starter motor for an internal combustion engine, having a thermal monitoring protector (4) for turning the starter (1) of when its limit operating temperature is reached, characterized by a device (5) for ascertaining a virtual operating temperature (T$_V$), wherein the device (5) ascertains the virtual operating temperature (T$_V$) as a function of at least one operating parameter that affects the operating temperature of the starter (1), wherein as the operating temperature of the starter (1) rises, the virtual operating temperature (T$_V$) is ascertained as a function of the starter current.

2. The starter of claim 1, characterized in that when the operating temperature is falling, the OFF time (deltat) of the starter (1) affects the virtual operating temperature (T$_V$).

3. The starter of claim 1, characterized in that the virtual operating temperature (T$_V$) is ascertained as a function of a reference temperature, in particular the ambient temperature of the starter (1).

4. The starter of claim 1, characterized in that the device (5) has a means (9) for detecting the ambient temperature.

5. The starter of claim 1, characterized in that the virtual operating temperature (T$_V$) is ascertained as a function of the current ratio $(i/i_0)^b$, in which i is the starter current, $i_0$ is a reference current, and b is a starter-specific parameter.

6. The starter of claim 1, characterized in that at a high virtual operating temperature (T$_V$) during the OFF time (deltat) of the starter (1), increased cooling of the starter (1) is assumed.

7. The starter of claim 1, characterized in that if the OFF time (deltat) lasts relatively long, a reduction in the cooling gradient (deltaT$_A$) of the virtual operating temperature (T$_V$) is assumed.

8. The starter of claim 1, characterized in that as a function of the OFF time (deltat) and of the instantaneous virtual operating temperature (T$_V$), the virtual operating temperature is set equal to the ambient temperature.

9. The starter of claim 1, characterized in that as a function of the cooling gradient (deltaT$_A$), the virtual operating temperature (T$_V$) is set equal to the ambient temperature.

10. The starter of claim 1, characterized in that as a function of the OFF time (deltat) or of the cooling gradient (deltaT$_A$), a graduated adaptation between the virtual operating temperature (T$_V$) and the reference temperature is performed.

* * * * *